(12) United States Patent
Kosseifi et al.

(10) Patent No.: US 10,820,051 B2
(45) Date of Patent: Oct. 27, 2020

(54) INHIBITING DISPLAY OF ADVERTISEMENTS WITH AGE-INAPPROPRIATE CONTENT

(71) Applicant: AT&T MOBILITY II LLC, Atlanta, GA (US)

(72) Inventors: Mario Kosseifi, Roswell, GA (US); Joseph Thomas, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 44 days.

(21) Appl. No.: 14/520,186

(22) Filed: Oct. 21, 2014

(65) Prior Publication Data

US 2016/0112760 A1   Apr. 21, 2016

(51) Int. Cl.
*H04N 21/454* (2011.01)
*H04N 21/81* (2011.01)
(Continued)

(52) U.S. Cl.
CPC ..... *H04N 21/4542* (2013.01); *H04N 21/4223* (2013.01); *H04N 21/42203* (2013.01);
(Continued)

(58) Field of Classification Search
CPC ......... H04N 21/23424; H04N 21/4143; H04N 21/4532; H04N 21/4755; H04N 21/4884; H04N 21/812; H04N 7/163; H04N 21/4542; H04N 21/4394; H04N 21/4415; H04N 21/44008; H04N 21/42203; H04N 21/441;
(Continued)

(56) References Cited

U.S. PATENT DOCUMENTS

| 6,072,520 A | 6/2000 | Yuen et al. |
| 6,898,762 B2 | 5/2005 | Ellis et al. |

(Continued)

FOREIGN PATENT DOCUMENTS

| CA | 2378304 C | 1/2001 |
| EP | 0082304 A1 | 6/1983 |

(Continued)

OTHER PUBLICATIONS

Duan, L. et al., "Segmentation, Categorization, and Identification of Commercials from TV Streams Using Multimodal Analysis", MULTIMEDIA '06, Proceedings of the 14th annual ACM international conference on Multimedia, ACM, New York, NY, USA, Oct. 2006, pp. 201-210.

(Continued)

*Primary Examiner* — Anthony Bantamoi
(74) *Attorney, Agent, or Firm* — Guntin & Gust, PLC; Mark Wilinski

(57) ABSTRACT

A method includes determining, at a media device, a rating associated with an advertisement. The method also includes receiving, at the media device, information from one or more sensors, where the information indicates that a viewer (e.g., a child) is located within an area associated with the media device. The method includes determining whether the advertisement includes age-inappropriate content for the viewer based on the rating and based on the information. When the advertisement includes age-inappropriate content for the viewer, the method includes inhibiting display of the advertisement.

20 Claims, 7 Drawing Sheets

(51) Int. Cl.
  *H04N 21/45* (2011.01)
  *H04N 21/435* (2011.01)
  *H04N 21/84* (2011.01)
  *H04N 21/442* (2011.01)
  *H04N 21/4223* (2011.01)
  *H04N 21/441* (2011.01)
  *H04N 21/422* (2011.01)
  *H04N 21/44* (2011.01)
  *H04N 21/4415* (2011.01)
  *H04N 21/439* (2011.01)
  *H04N 21/475* (2011.01)

(52) U.S. Cl.
  CPC ....... *H04N 21/435* (2013.01); *H04N 21/4394* (2013.01); *H04N 21/441* (2013.01); *H04N 21/44008* (2013.01); *H04N 21/4415* (2013.01); *H04N 21/44218* (2013.01); *H04N 21/44227* (2013.01); *H04N 21/4532* (2013.01); *H04N 21/812* (2013.01); *H04N 21/84* (2013.01); *H04N 21/4751* (2013.01); *H04N 21/4753* (2013.01)

(58) Field of Classification Search
  CPC ......... H04N 21/4223; H04N 21/44227; H04N 21/44218; H04N 21/84; H04N 21/435; H04N 21/4753; H04N 21/4751
  See application file for complete search history.

(56) References Cited

U.S. PATENT DOCUMENTS

| | | | |
|---|---|---|---|
| 7,200,852 B1 | 4/2007 | Block | |
| 7,293,276 B2 | 11/2007 | Phillips et al. | |
| 7,328,450 B2 | 2/2008 | Macrae et al. | |
| 7,340,398 B2 | 3/2008 | Lin | |
| 7,895,622 B2 | 2/2011 | Ellis et al. | |
| 8,099,278 B2 | 1/2012 | Witzman | |
| 8,312,484 B1* | 11/2012 | McCarty | H04N 21/4542 725/28 |
| 8,359,616 B2 | 1/2013 | Rosenberg et al. | |
| 8,386,465 B2 | 2/2013 | Ansari et al. | |
| 8,635,642 B2 | 1/2014 | Leung et al. | |
| 2003/0005432 A1 | 1/2003 | Ellis et al. | |
| 2004/0025189 A1 | 2/2004 | Bauersachs et al. | |
| 2006/0130119 A1* | 6/2006 | Candelore | H04N 7/16 |
| 2007/0204288 A1* | 8/2007 | Candelore | H04N 5/4401 725/28 |
| 2007/0293198 A1 | 12/2007 | Sanmugasuntharam et al. | |
| 2009/0025022 A1* | 1/2009 | Blatchley | H04H 60/33 725/9 |
| 2009/0199231 A1 | 8/2009 | Tsuria et al. | |
| 2010/0175081 A1 | 7/2010 | Boylan, III et al. | |
| 2011/0069940 A1* | 3/2011 | Shimy | H04N 5/76 |
| 2011/0237324 A1* | 9/2011 | Clavin | G06K 9/00369 463/29 |
| 2011/0283311 A1 | 11/2011 | Luong | |
| 2012/0060176 A1* | 3/2012 | Chai | H04H 60/45 725/10 |
| 2012/0304208 A1 | 11/2012 | Mcwilliams | |
| 2013/0036200 A1* | 2/2013 | Roberts | G06F 15/16 |
| 2013/0339015 A1* | 12/2013 | Lee | G10L 21/00 704/235 |
| 2014/0019130 A1 | 1/2014 | Jordan et al. | |
| 2014/0208340 A1* | 7/2014 | Poornachandran | H04N 21/44218 725/10 |
| 2014/0330650 A1 | 11/2014 | Karmarkar et al. | |
| 2015/0095985 A1* | 4/2015 | Hua | H04L 63/10 726/4 |
| 2016/0057497 A1* | 2/2016 | Kim | H04N 21/44218 725/10 |

FOREIGN PATENT DOCUMENTS

| | | |
|---|---|---|
| EP | 2429183 A1 | 3/2012 |
| WO | 2004064377 A2 | 7/2004 |

OTHER PUBLICATIONS

Lienhart, R. et al., "On the Detection and Recognition of Television Commercials", Technical Report, 1996, University of Mannheim, 17 pages.

Poull, N. et al., "Privacy in a Transparent World", Chapters 1-6, First Edition, Dec. 2007, Ethica Publishing, Boulder, CO, pp. 1-77.

Sadlier, D. et al., "Automatic TV Advertisement Detection from MPEG Bitstream", Proc. Int. Conf. on Enterprise Information Systems, ICEIS, 2001, 20 pages.

Satterwhite, B. et al., "Automatic Detection of TV Commercials", Potentials, vol. 23, Issue 2, Apr./May 2004, IEEE, pp. 9-12.

Van Brandenburg, R., "Towards multi-user personalized TV services, introducing combined RFID Digest authentication", TNO Information and Communication Technology, TNO report, RA 35120, Dec. 10, 2009, 98 pages.

* cited by examiner

INHIBITING DISPLAY OF ADVERTISEMENTS WITH AGE-INAPPROPRIATE CONTENT

FIELD OF THE DISCLOSURE

The present disclosure is generally related to inhibiting display of particular advertisements.

BACKGROUND

Television or other multimedia programming may include advertisements that may be unsuitable or otherwise offensive for children. Parents may desire to limit exposure of their children to such advertisements. However, parents may have limited options available to prevent exposure of children to inappropriate advertisements. For example, when a parent notices an offensive commercial, the parent may turn off the television, switch to another channel, ask a child to leave the room, or decide to not watch an otherwise harmless television program. These limited options may result in families missing programming that may otherwise include content that is appropriate for children. Further, in some cases, the child may be exposed to inappropriate advertisements when the parent is not present.

DETAILED DESCRIPTION

Figure 1:
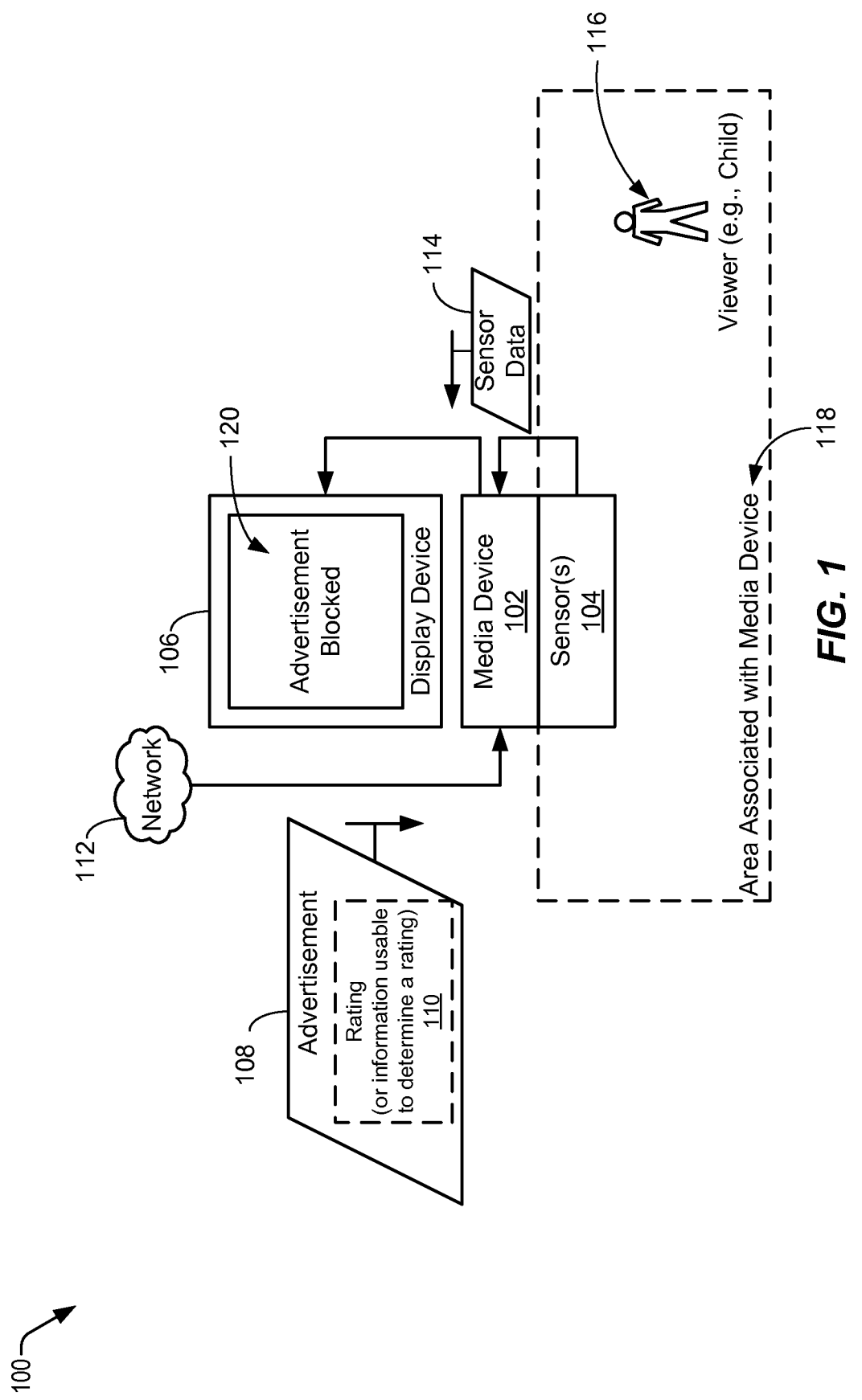
FIG. 1 is a diagram that illustrates a particular embodiment of a system for inhibiting display of advertisements that include age-inappropriate content for a viewer (e.g., a child)

The present disclosure describes a parental control application that determines or processes a rating of an advertisement (e.g., a commercial) shown in connection with a program. When a particular viewer (e.g., a child) is determined to be present in an area associated with a media device (e.g., a set-top box device, a wireless device, or a television), the parental control application may allow only age-appropriate commercials to be displayed. The parental control application may provide parents with more control over what advertisements their children are watching.

In some cases, advertisements may be rated using ratings that are similar to television content ratings (e.g., Y, TVG, TVPG, TVMA, also V, S, AC) and/or movie ratings (e.g., G, PG, PG-13, R). As illustrative examples, alcohol advertisements may be assigned an R rating, violent video game advertisements may be assigned a V rating, and toy advertisements may be assigned a G rating. The advertisements may be assigned ratings based on industry agreement or a standard (such as the standard for television content ratings). In some cases, the advertisements may be rated by an advertiser or by a service provider (e.g., by a cable service provider, a satellite service provider, or an Internet Protocol Television (IPTV) service provider). That is, in some cases, an advertisement may include a rating that is assigned (e.g., by an advertiser or a service provider) prior to the advertisement being received at the media device. In other cases, ratings may be assigned to particular types of advertisements by users. To illustrate, an adult user may configure the media device, such as a set-top box device, to assign particular ratings to specific genres or other categories of advertisements. For example, the adult user may configure the media device to assign advertisements related to alcohol a mature rating. In this case, the media device (or a server in communication with the media device) may analyze information related to the advertisement (such as closed captioning information or metadata associated with the advertisement) to determine the genre (or category) of the advertisement and then use the genre (or category) to determine the rating.

After a rating has been determined for a particular advertisement, the media device may determine whether the particular advertisement is appropriate for users that are present (e.g., users that are in a room with a display device or proximate to the display device). In one example, users that are present may provide identifying information (e.g., user identification, etc.). To illustrate, a parent or a child may provide information indicating that a child is present. For example, a remote control associated with the media device may include a button that may be actuated to indicate to the media device that a child is present or to cause the media device to switch to a "Child in the Room" setting.

In another example, a token or other identification system may be used to determine whether particular users (e.g., children) are present. To illustrate, a child may be provided with a token (e.g., a bracelet, a mobile computing device, a mobile communication device) that he or she wears or carries. The token may be electronically detectable (e.g., using radio frequency identification (RFID), near-field communication (NFC), or similar systems). In this illustrative example, when the token is present, the media device may determine that the child is present.

In another example, non-token based recognition may be used to determine whether particular users (e.g., children) are present. To illustrate, one or more sensors may be used to gather information that may be used to identify user(s) that are present. In some cases, sensor(s) of the media device may identify a size and/or a shape of an individual that is present in the room. Alternatively, the sensor(s) may monitor other environmental conditions (e.g., a temperature) and may determine whether a person has entered the room based on a change of environmental conditions (e.g., a slight rise in temperature). In some cases, facial recognition and/or voice recognition may be used to identify specific users or characteristics of specific users, such as age, height, face, voice, etc. To illustrate, an adult user may provide identifying information for each child, such as an age, a gender, a voice print/sample, a height, a size, a weight, an image snapshot, or a fingerprint. The adult may provide the identifying information for one or more viewers in a household (e.g., parents and children), and the identifying information may be stored at the media device as viewer profile(s). In this example, determining whether an advertisement is appropriate for a particular viewer may include accessing a viewer profile associated with the particular viewer and determining whether a particular advertisement includes age-appropriate content based on the viewer profile and a rating associated with the particular advertisement. Alternatively, the media device may estimate an age (or an age range) of the viewer based on one or more user characteristics (e.g., a size, shape, voice, face), and the media device may determine whether a particular advertisement includes age-appropriate content based on the estimated age (or an age range) of the viewer and a rating associated with the particular advertisement. In another example, the media device may present a user interface to enable an adult user to confirm that a child is present.

When a child is determined to be present, the media device may inhibit display of age-inappropriate content (e.g., certain commercials). In some cases, the parental control application may automatically substitute age-appropriate commercials for age-inappropriate commercials. Alternatively, the media device may blank a display during an age-inappropriate commercial, display predetermined programming, or change the channel. When the advertisement including the age-inappropriate content is over, a standard television feed may resume (e.g., a subsequent advertisement or a program may be displayed).

Referring to FIG. 1, a particular embodiment of a system to inhibit display of advertisements that include age-inappropriate content for particular viewers is illustrated and generally designated 100. The system 100 of FIG. 1 includes a media device 102 that is communicatively coupled to (or that includes) one or more sensors 104 and coupled to a display device 106. In the particular embodiment illustrated in FIG. 1, an advertisement 108 and information that identifies a rating 110 of the advertisement 108 may be received at the media device 102 via a network 112. The network 112 may include a wired or a wireless network, such as an over-the-air (OTA) network, a cable network, a satellite network, or an Internet Protocol Television (IPTV) network. Thus, FIG. 1 illustrates one example in which rating information for an advertisement is received at the media device 102 from a service provider. In FIG. 1, an advertiser (or the service provider) may assign the rating 110 (e.g., based on industry agreement or standard) before sending the advertisement 108 to the media device 102 via the network 112. In other cases, as described further herein, the advertisements received at the media device 102 may not include rating information (see e.g., FIGS. 2 and 3). An advertisement may include information (e.g., closed captioning information or metadata) that is usable to determine a rating of the advertisement.

The media device 102 is configured to receive information from the one or more sensors 104. The information may include sensor data 114 indicating that a viewer 116 is located within an area 118 that is associated with the media device 102. For example, the viewer 116 may be determined to be located within the area 118 when the viewer 116 is in a room with the display device 106 or is located proximate to the display device 106. While FIG. 1 illustrates a particular example in which the media device 102 and the one or more sensors 104 may be separate devices that are communicatively coupled via a wired or wireless connection, in alternative cases the one or more sensors 104 may be included within the media device 102. As an illustrative, non-limiting example, the media device 102 may include a set-top box device, and the sensor(s) 104 may include camera(s), microphone(s), wireless signal detection component(s), token detection component(s), or a combination thereof. The sensor(s) 104 may be included within the media device 102 or may be separate from the media device 102 (e.g., in a sound-bar, a component of a gaming device, etc.) and communicatively coupled to the media device 102.

Figure 2:
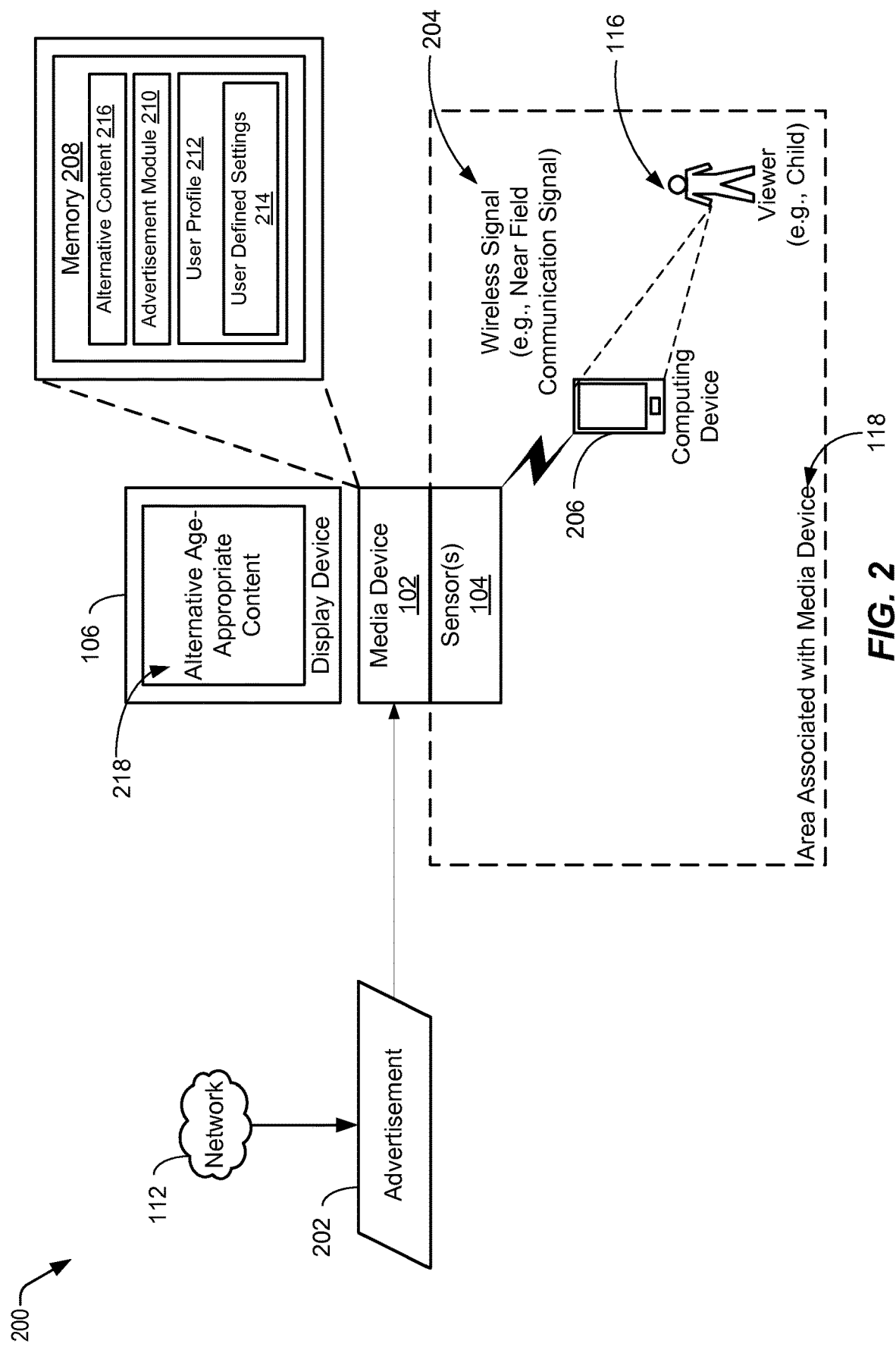
FIG. 2 is a diagram that illustrates another embodiment of a system for inhibiting display of advertisements that include age-inappropriate content for a viewer (e.g., a child)

As described further herein, in some cases, the sensor(s) 104 may determine that the viewer 116 is located within the area 118 associated with the media device 102 in response to receiving a wireless signal, such as a near-field communication (NFC) signal, from a mobile computing device (as described further herein with respect to FIG. 2). As another example, the sensor(s) 104 may determine that the viewer 116 is located within the area 118 associated with the media device 102 in response to wirelessly detecting a token, such as a radio frequency identification (RFID) token (as described further herein with respect to FIG. 3). As a further example, the sensor(s) 104 may include camera(s) and/or microphone(s) that provide information (e.g., size, shape, voice, face information) to the media device 102, and the media device 102 may identify the viewer 116 based on the information (as described further herein with respect FIG. 4). In some cases, the media device 102 may identify the viewer 116 using image recognition software and/or voice recognition software.

The media device 102 is further configured to determine whether the advertisement 108 includes age-inappropriate content for the viewer 116 based on the rating 110 and an age (or estimated age or age range) of the viewer 116. In response to determining that the advertisement 108 includes age-inappropriate content for the viewer 116, the media device 102 is configured to inhibit display of the advertisement 108. For example, FIG. 1 illustrates a particular example in which a message 120 indicating that the advertisement 108 has been blocked is displayed at the display device 106. Alternatively, as described further with respect to FIGS. 2-4, other examples of inhibiting display of a particular advertisement may include displaying alternative age-appropriate content (see FIG. 2), changing to an alternative channel with age-appropriate content (see FIG. 3), or displaying a message prompting a user to confirm that a child is present (see FIG. 4), among other alternatives (e.g., blanking a screen during the advertisement 108).

As an illustrative, non-limiting example, the rating 110 may represent a rating for the advertisement 108 that is similar to television content ratings (e.g., TVY, TVY7, TVG, TVPG, TV14, TVMA, also V, S, AC) and/or movie ratings (e.g., G, PG, PG-13, R). To illustrate, TVY may be appropriate for all children (including young children, ages 2-6), TVY7 may be appropriate for children age 7 and older, TVG may be suitable for all ages, TVPG may be unsuitable for younger children, TV14 may be unsuitable for children under 14 years of age, and TVMA may be unsuitable for children under the age of 17. Similarly, a G ("General Audiences") rating for movies may include material suitable for all ages, a PG ("Parental Guidance Suggested") rating may include some material that may not be suitable for children, a PG-13 ("Parents Strongly Cautioned") rating for movies may include some material that may be inappropriate for children under 13, and an R ("Restricted") rating for movies may require a parent or adult guardian for children under 17. In some cases, the advertisement 108 may be assigned the rating 110 based on industry agreement or a standard. As a first illustrative example, in the event that the advertisement 108 includes an alcohol advertisement, the rating 110 may correspond to an R rating. The rating 110 may be assigned by an advertiser associated with the advertisement 108 (e.g., an alcoholic beverage company) or by a service provider prior to the advertisement 108 being sent to the media device 102 via the network 112. Accordingly, FIG.

1 illustrates that the media device 102 may inhibit display of the alcohol advertisement based on the R rating (e.g., by blocking the advertisement 108 before the advertisement 108 is displayed at the display device 106, as shown at 120) when the viewer 116 is a child.

As a second illustrative example, in the event that the advertisement 108 includes a violent video game advertisement, the rating 110 may correspond to a V rating. In this case, the media device 102 may inhibit display of the violent video game advertisement based on the V rating (e.g., by blocking the advertisement 108 before the advertisement 108 is displayed at the display device 106, as shown at 120). As a third illustrative example, in the event that the advertisement 108 includes a toy advertisement, the rating 110 may correspond to a G rating. In this case, while not shown in the example of FIG. 1, the advertisement 108 may be displayed at the display device 106 based on the G rating that is indicative of age-appropriate content. As another example, while not shown in the example of FIG. 1, in the event that the viewer 116 is determined to be an adult, the media device 102 may substitute an adult-appropriate advertisement (e.g., an alcohol advertisement) for the toy advertisement.

Thus, FIG. 1 illustrates a particular embodiment in which the advertisement 108 includes (or is sent with) information that identifies the rating 110 of the advertisement 108. For example, the rating 110 may be similar to television content ratings (e.g., Y, TVG, TVPG, TVMA, also V, S, AC) and/or movie ratings (e.g., G, PG, PG-13, R). When the sensor(s) 104 indicate that the viewer 116 is located within the area 118 associated with the media device 102 (and that the viewer 116 is a child or has an age or estimated age in a particular range), the media device 102 may inhibit display of the advertisement 108 (e.g., by blocking the advertisement 108, as shown at 120) when the rating 110 indicates that the advertisement 108 includes age-inappropriate content for the viewer 116 (e.g., a child).

Referring to FIG. 2, another embodiment of a system that is capable of inhibiting display of advertisements that include age-inappropriate content is illustrated and generally designated 200. FIG. 2 illustrates a particular example in which an advertisement 202 does not include information that identifies a rating associated with the advertisement 202. Accordingly, in FIG. 2, the rating of the advertisement 202 may be determined at the media device 102. FIG. 2 further illustrates a particular embodiment in which the sensor(s) 104 may determine that the viewer 116 is located within the area 118 associated with the media device 102 based on a wireless signal 204 received from a computing device 206. In some cases, the wireless signal 204 received from the computing device 206 may include a near-field communication (NFC) signal.

In the particular example of FIG. 2, the advertisement 202 may be received at the media device 102 via the network 112. As described with respect to FIG. 1, the media device 102 is configured to receive information from the sensor(s) 104 indicating that the viewer 116 is located within the area 118 associated with the media device 102 (e.g., when the viewer 116 is in a room with the display device 106 or proximate to the display device 106). In the particular embodiment illustrated in FIG. 2, the sensor(s) 104 may determine that the viewer 116 is located within the area 118 associated with the media device 102 in response to receiving the wireless signal 204 from the computing device 206. In some cases, the wireless signal 204 may include an NFC signal, a Wi-Fi signal, an infrared signal, or a radio frequency signal, among other alternatives. In a particular embodiment, the computing device 206 may be a mobile computing device (e.g., a phone, a tablet computing device, etc.) of a child. In this case, the media device 102 may determine that the viewer 116 is a child based on information included in the wireless signal 204 that identifies the computing device 206 as being associated with a child. As an illustrative, non-limiting example, the wireless signal 204 may include a media access control (MAC) address, and the media device 102 may store the MAC address in a memory 206 in association with a particular child. In some cases, there may be multiple children associated with a particular location (e.g., a household). Accordingly, in these cases, individual MAC addresses (or other device identifiers) associated with individual computing devices for each child may be stored in the memory 206 and may be used to determine whether to inhibit display of particular advertisements.

In the particular embodiment illustrated in FIG. 2, the media device 102 includes an advertisement module 210 that may be stored in the memory 208. The advertisement module 210 may be configured to determine a rating associated with the advertisement 202. In some cases, the advertisement module 210 may access a user profile 212 that may include user defined settings 214 in order to assign a rating to the advertisement 202. A user (e.g., an adult user or a parent) may assign particular ratings to particular types of advertisements, and the user may save the information in the user profile 212 as the user defined settings 214. As illustrative, non-limiting examples, the user (e.g., the parent) may assign a mature rating (e.g., an R rating) to advertisements related to alcohol, a violent rating (e.g., a V rating) to advertisements related to violent video games, and a general audience rating (e.g., a G rating) to advertisements related to toys, among other alternatives.

In operation, the media device 102 of FIG. 2 may determine whether the advertisement 202 includes age-inappropriate content for the viewer 116 based on the rating that is assigned to the advertisement 202 by the advertisement module 210 and based on an age of the viewer 116. In response to determining that the advertisement 202 includes age-inappropriate content, the media device 102 may retrieve alternative content 216 from the memory 208. In the particular embodiment illustrated in FIG. 2, the media device 102 may inhibit display of the advertisement 202 before the advertisement 202 is displayed at the display device 106 and may cause display of the alternative content 216 at the display device 106 during a time period associated with the advertisement 202, as shown at 218.

As a first illustrative example, the advertisement 202 may include an alcohol advertisement, and the advertisement module 210 may assign a rating corresponding to an R rating based on the user defined settings 214 stored in the user profile 212. In this case, the media device 102 may determine that the advertisement 202 includes age-inappropriate content for any child viewer based on the R rating. Accordingly, the media device 102 may inhibit display of the advertisement 202, as the adult user (e.g., a parent) has provided the user defined settings 214 that indicate that advertisements related to alcohol represent age-inappropriate content for the viewer 116 (e.g., a child) and that display of this type of advertisement is to be inhibited. As a second illustrative example, the advertisement 108 may include a violent video game advertisement, and the advertisement module 210 may assign a rating corresponding to a V rating based on the user defined settings 214 stored in the user profile 212. Accordingly, the media device 102 may inhibit display of the advertisement 202 for certain viewers (e.g., for children having an age below a threshold, such as under the age of 13), as the user defined settings 214 indicate that advertisements related to violent video games represent age-inappropriate content for the viewer 116 (or some viewers) and that display of this type of advertisement is to be inhibited.

In the particular embodiment illustrated in FIG. 2, alternative age-appropriate content is displayed at the display device 106, as shown at 218. For example, the alternative age-appropriate content may be stored in the memory 208 of the media device 102. As another example, the alternative age-appropriate content may be accessible to the media device 102 via the network 112. In some cases, the alternative age-appropriate content may include audio, video, still image(s), or a combination thereof that may be appropriate for a child (e.g., content having a G rating). Alternatively, as described further with respect to FIG. 3, the alternative age-appropriate content may represent content that is associated with another television channel (e.g., a kids channel or a music channel), and the media device 102 may be configured to inhibit display of a particular advertisement by changing from a current television channel associated with the particular advertisement to the other television channel.

Thus, in contrast to FIG. 1, FIG. 2 illustrates that an advertiser or a service provider may not assign a rating to the advertisement 202 before the advertisement 202 is sent to the media device 102. Accordingly, the media device 102 may determine the rating using the advertisement module 210 (e.g., based on the user profile 212 that includes the user defined settings 214). FIG. 2 further illustrates that the advertisement module 210 may access alternative content 216 (e.g., age-appropriate content) that may be stored in the memory 208 for display via the display device 106, as shown at 218. One benefit of using the media device 102 to determine whether to inhibit display of the advertisement 202 is that age-inappropriate advertisements may be blocked regardless of whether an advertiser provides a rating for the advertisement 202.

Figure 3:
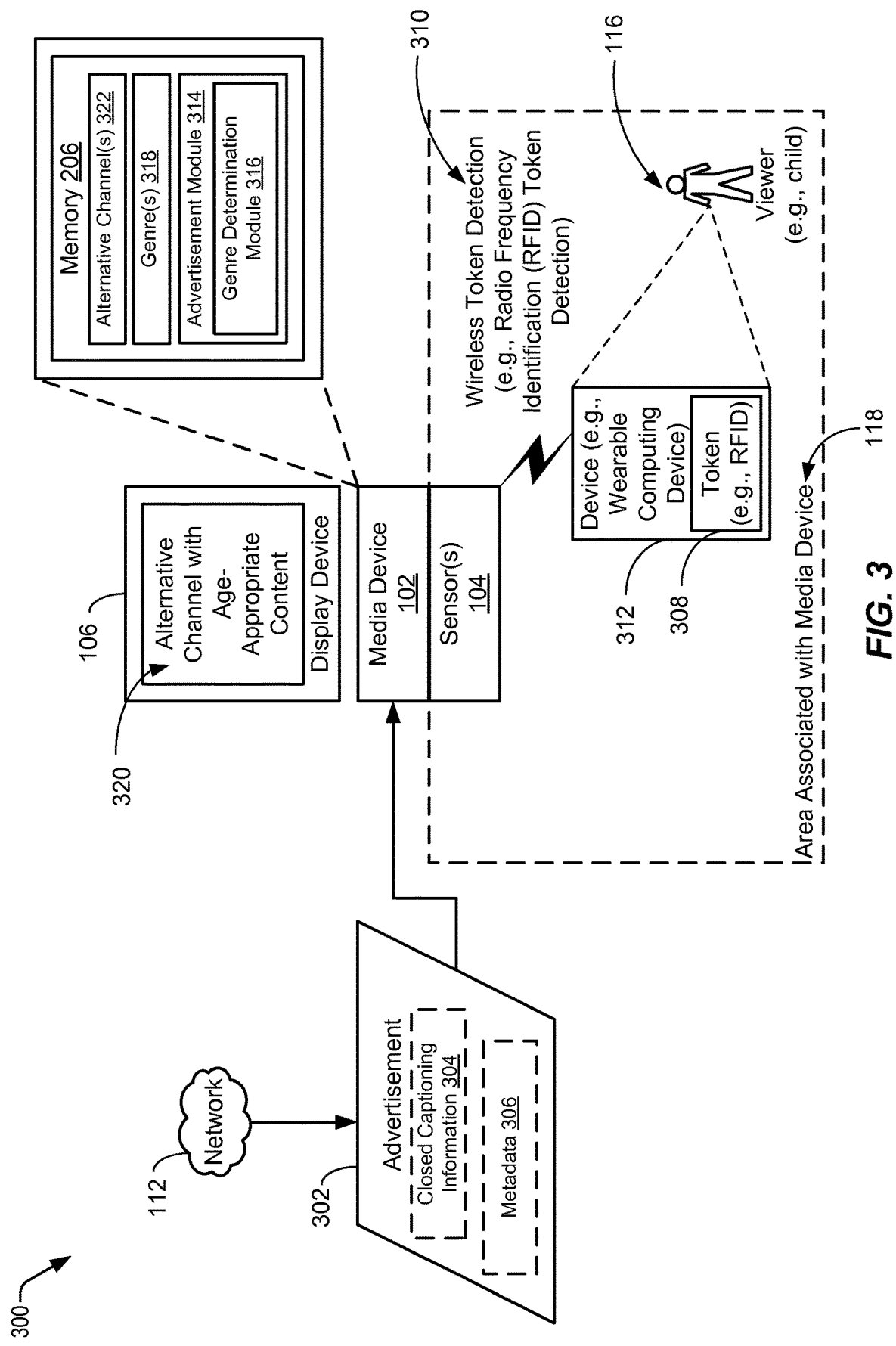
FIG. 3 is a diagram that illustrates another embodiment of a system for inhibiting display of advertisements that include age-inappropriate content for a viewer (e.g., a child)

Referring to FIG. 3, another embodiment of a system that is capable of inhibiting display of advertisements that include age-inappropriate content is illustrated and generally designated 300. FIG. 3 illustrates another example in which an advertisement 302 does not include information that identifies a rating associated with the advertisement 302. The rating of the advertisement 302 may be determined at the media device 102. In FIG. 3, a rating of the advertisement 302 may be determined based on closed captioning information 304 associated with the advertisement 302, metadata 306 associated with the advertisement 302, or a combination thereof. FIG. 3 further illustrates a particular embodiment in which the sensor(s) 104 may determine that the viewer 116 is located within the area 118 associated with the media device 102 in response to wireless detection of a token 308, as shown at 310. For example, the token 308 may be included within a device 312, and the token 308 may be wirelessly detectable by the one or more sensors 104 based on a signal (e.g., an RFID signal).

In the particular example of FIG. 3, the advertisement 302 may be received at the media device 102 via the network 112 (e.g., via a wired or wireless network, such as a cable network, a satellite network, or an IPTV network). As described with respect to FIG. 1, the media device 102 is configured to receive information from the one or more sensors 104 indicating that the viewer 116 is located within the area 118 associated with the media device 102 (e.g., when the viewer 116 is in a room with the display device 106 or proximate to the display device 106). In the particular embodiment illustrated in FIG. 3, the one or more sensor(s) 104 may determine that the viewer 116 is located within the area 118 associated with the media device 102 in response to wirelessly detecting the token 308, as shown at 310. FIG. 3 illustrates that, in some cases, the token 308 may be included within a device 312 (e.g., a wearable computing device) associated with the viewer 116, such as a watch, bracelet, or a headset. In a particular embodiment, the device 312 may be a mobile computing device (e.g., a phone, a tablet computing device, etc.) of a child. In this case, the media device 102 may determine that the viewer 116 is a child based on the token 308 that identifies the device 312 as being associated with a child. As an illustrative, non-limiting example, the token 308 may be associated with a particular RFID tag, and the media device 102 may store information associated with the particular RFID tag in the memory 206 in association with a particular child. In some cases, there may be multiple children associated with a particular location (e.g., a household). Accordingly, in these cases, information associated with multiple individual tokens (e.g., multiple RFID tags) associated with individual children may be stored in the memory 206 and may be used to determine whether to inhibit display of particular advertisements.

In the particular embodiment illustrated in FIG. 3, the media device 102 includes an advertisement module 314 that may be stored in the memory 206. The advertisement module 314 may be configured to determine a rating associated with the advertisement 302. FIG. 3 illustrates that the advertisement module 314 may include a genre determination module 316 to determine a genre associated with the advertisement 302. In the particular embodiment illustrated in FIG. 3, one or more genres 318 may be stored in the memory 206, and the advertisement module 314 may be configured to determine a particular genre that is associated with the advertisement 302 based on the closed captioning information 304, the metadata 306, or a combination thereof.

As an illustrative example, the closed captioning information 304 associated with the advertisement 302 may include one or more words that are stored in the memory 206 and that are associated with a genre of alcohol advertisements. In this example, the advertisement module 314 may assign a rating corresponding to an R rating based on a determination that the advertisement 302 includes content related to alcohol, representing age-inappropriate content for children. Accordingly, the media device 102 may inhibit display of the advertisement 302 if a child viewer is detected. Alternatively or additionally, the metadata 306 associated with the advertisement 302 may include one or more words associated with particular advertisers. To illustrate, with respect to the genre of alcohol advertisements, the memory 206 may store information such as names of alcoholic beverage companies, names of particular brands of alcoholic beverages, types of alcoholic beverages (e.g., beer, wine, rum, whiskey, etc.), among other alternatives. When the advertisement module 314 determines that the advertisement 302 is related to alcohol based on a comparison of the metadata 306 included in the advertisement 302 to the genre(s) 318 stored in the memory 206, the media device 102 may inhibit display of the advertisement 302 if a child viewer is detected.

As another illustrative example, the closed captioning information 304 associated with the advertisement 302 may include one or more words that are stored in the memory 206 and that are associated with a genre of violent video game advertisements. To illustrate, the memory 206 may store information such as names of violent video games or names of particular video game makers, among other alternatives. In this example, the advertisement module 314 may assign a rating corresponding to a V rating based on a determination that the advertisement 302 includes content related to violent video games, representing age-inappropriate content for certain children based on age or age range. Accordingly, the media device 102 may inhibit display of the advertisement 302 if a child viewer is present. Alternatively or additionally, the metadata 306 associated with the advertisement 302 may include one or more words that are stored in the memory 206 and that are associated with a genre of violent video game advertisements. When the advertisement module 314 determines that the advertisement 302 includes age-inappropriate content for a particular viewer based on a comparison of the metadata 306 included in the advertisement 302 to the genre(s) 318 stored in the memory 206, the media device 106 may inhibit display of the advertisement 302.

In the particular embodiment illustrated in FIG. 3, an alternative channel with age-appropriate content is displayed at the display device 106, as shown at 320. For example, one or more alternative channels 322 that are associated with age-appropriate content may be stored in the memory 208 of the media device 102. As another example, the alternative channels that are associated with age-appropriate content may be accessible to the media device 102 via the network 112. The media device 102 may be configured to inhibit display of the advertisement 302 related to alcohol or to a violent video game by changing from a current television channel associated with the alcohol or violent video game advertisement to another television channel (e.g., a kids music channel or another kids channel).

Thus, FIG. 3 illustrates that the advertisement 302 may not include information that identifies a rating associated with the advertisement 302. Accordingly, the rating may be determined at the media device 102 using the advertisement module 314. The advertisement module 314 may use the closed captioning information 304 included with the advertisement 302 and/or the metadata 306 included with the advertisement 302 to determine a genre associated with the advertisement 302. Based on the genre, the advertisement module 314 may assign a rating to the advertisement 302, and age-inappropriate content may be inhibited from display. FIG. 3 further illustrates that the advertisement module 314 may access alternative channel(s) 322 (e.g., age-appropriate channels) for display via the display device 106, as shown at 320.

Figure 4:
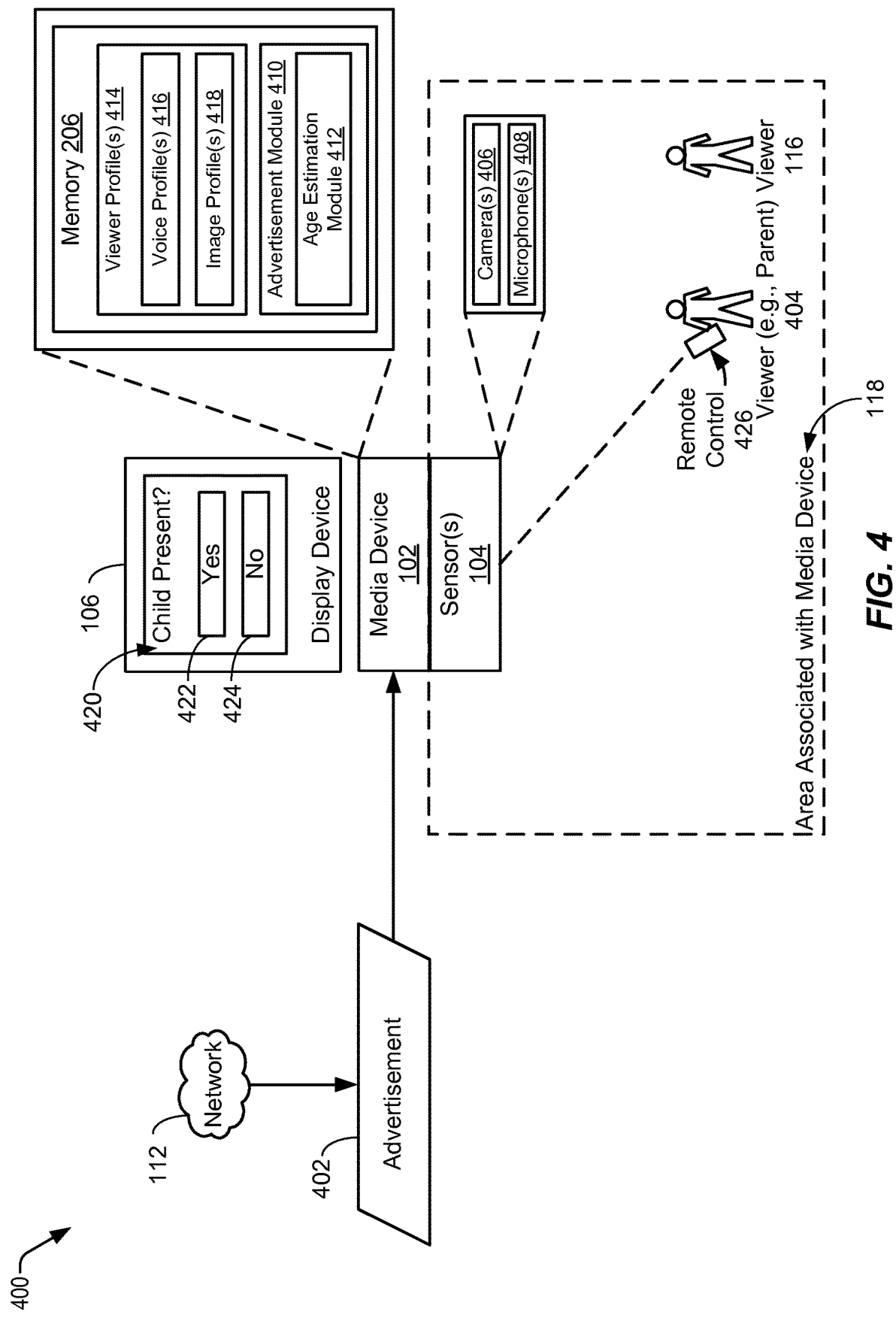
FIG. 4 is a diagram that illustrates another embodiment of a system for inhibiting display of advertisements that include age-inappropriate content for a viewer (e.g., a child)

Referring to FIG. 4, another embodiment of a system that is capable of inhibiting display of advertisements that include age-inappropriate content is illustrated and generally designated 400. FIG. 4 further illustrates a particular embodiment in which the sensor(s) 104 may provide information (e.g., size, shape, voice, face information) to the media device 102. In some embodiments, the information may be used by the media device 102 to identify the viewer 116 (e.g., by voice or facial recognition) or to estimate an age of the viewer 116 in order to determine whether to inhibit display of age-inappropriate content. FIG. 4 further illustrates that an adult viewer 404 (e.g., a parent) may provide an indication to the media device 102 to confirm whether the viewer 116 is a child (or has an age within a particular age range).

In the particular example of FIG. 4, an advertisement 402 may be received at the media device 102 via the network 112 (e.g., via a wired or wireless network, such as a cable network, a satellite network, or an IPTV network). As described with respect to FIG. 1, the media device 102 is configured to receive information from the one or more sensors 104 indicating that the viewer 116 (and the adult viewer 404) is located within the area 118 associated with the media device 102 (e.g., when the viewer 116 and the adult viewer are in a room with the display device 106 or proximate to the display device 106). In the embodiment illustrated in FIG. 4, the one or more sensors 104 include one or more cameras 406, one or more microphones 408, or a combination thereof. Thus, the one or more sensors 104 may detect that the viewer 116 (and the adult viewer 404) is located within the area 118 based on visual information, audio information, or a combination thereof.

In the particular embodiment illustrated in FIG. 4, the media device 102 includes an advertisement module 410 that may be stored in the memory 206. In some cases, the advertisement 402 may include a rating (not shown in FIG. 4). In this case, as described with respect to FIG. 1, the advertisement module 410 may determine whether to inhibit display of particular content based on the rating included in the advertisement (and based on the age or estimated age range of the viewer 116). In other cases, the advertisement 402 may not include a rating. In these cases, the advertisement module 410 may be configured to determine the rating of the advertisement 402, as described further with respect to FIG. 2 and FIG. 3.

FIG. 4 illustrates that the advertisement module 410 may include an age estimation module 412 to estimate an age of the viewer 116 based on the information received from the one or more sensors 104. In the particular embodiment illustrated in FIG. 4, one or more viewer profiles 414 may be stored in the memory 206 and may include one or more voice profiles 416 and/or one or more image profiles 418. In some cases, voice recognition may be performed by comparing voice information received from the one or more microphones 408 to the one or more voice profiles 416 stored in the memory 206. In other cases, facial recognition may be performed by comparing visual information received from the one or more cameras 406 to the one or more image profiles 418 stored in the memory 206. In some cases, the advertisement module 410 may also estimate the age of the adult viewer 404. Alternatively, the adult viewer 404 may provide identifying information, such as a personal identification number (PIN) or a fingerprint, among other alternatives to identify herself as an adult.

When the advertisement module 410 determines, based on voice recognition and/or facial recognition that the viewer 116 is a child (or a child with an age in a certain age range), the media device 102 may inhibit display of the advertisement 402 in the event that the advertisement 402 includes age-inappropriate content. In some cases, the advertisement module 410 may be unable to determine a match based on voice recognition and/or facial recognition (e.g., when the child does not have a profile). However, size information, facial information, and/or voice information may indicate that the viewer 116 is a child, and the advertisement module 410 may inhibit display of the advertisement 402 in the event that the advertisement 402 includes age-inappropriate content. In the particular embodiment illustrated in FIG. 4, a user interface 420 may be displayed via the display device 106. The user interface 420 may include text and/or a prompt (e.g., "Child Present?") to indicate (e.g., to the adult viewer 404) that a child has been detected in the area 118. In the example illustrated in FIG. 4, the user interface 420 includes a first selectable option 422 to confirm that the viewer 116 is a child and a second selectable option 424 to indicate that the viewer 116 is not a child. FIG. 4 further illustrates that the adult viewer 404

(e.g., the parent) may select one of the selectable options 422, 424 via a remote control 426 associated with the media device 102.

Thus, FIG. 4 illustrates that the one or more sensors 104 (e.g., the camera(s) 406 and/or the microphone(s) 408) may provide information to determine whether the viewer 116 (e.g., a child) is located within the area 118 associated with the media device 102 (e.g., by voice recognition, facial recognition, or by estimating an age of the viewer 116). FIG. 4 further illustrates that in some cases the adult viewer 404 (e.g., a parent) may confirm that the viewer 116 is a child (e.g., by selecting the first selectable option 422 using the remote control 426). Thus, the media device 102 may inhibit display of the advertisement 402 when the advertisement 402 appears to represent age-inappropriate content for the viewer 116, but the adult viewer 404 may provide an indication to the media device 102 that the viewer 116 is not a child (e.g., by selecting the second selectable option 424 via the remote control 426). In this case, the media device 102 may display the advertisement 402 and/or subsequent advertisement(s) that would otherwise appear to represent age-inappropriate content for the viewer 116. In some cases, the adult viewer 404 may override the inhibition of display of the advertisement 402 by selecting the second selectable option 424 via the remote control 426.

Figure 5:
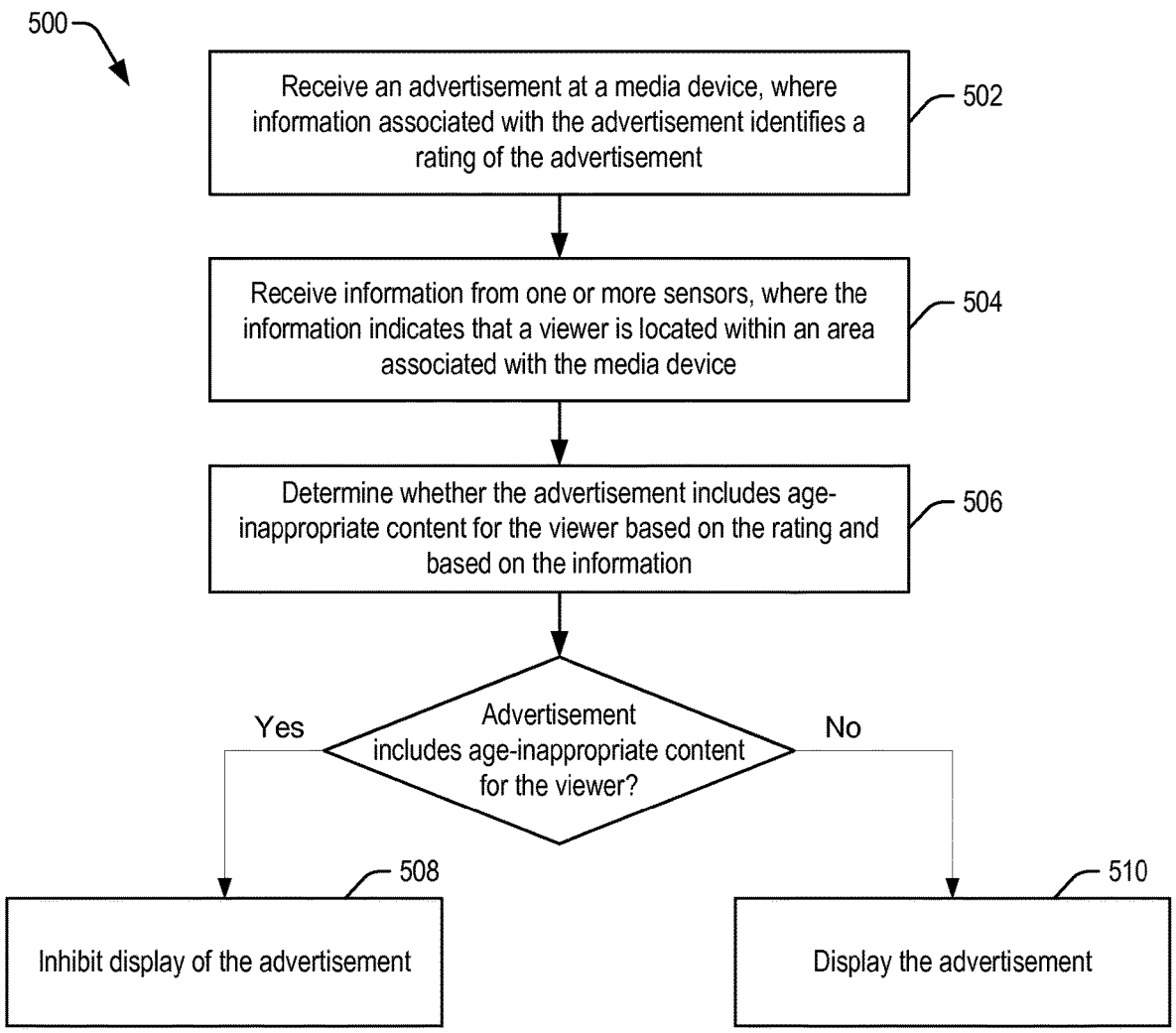
FIG. 5 is a flowchart that illustrates a particular embodiment of a method to inhibit display of advertisements that include age-inappropriate content for a viewer (e.g., a child)

Referring to FIG. 5, a particular embodiment of a method to inhibit display of advertisements that include age-inappropriate content for certain viewers is illustrated and generally designated 500. FIG. 5 illustrates a particular example in which information associated with an advertisement may identify a rating of the advertisement. In FIG. 5, a media device may inhibit display of the advertisement when the rating indicates that the advertisement includes age-inappropriate content for a particular viewer (e.g., a child) and the particular viewer is located within an area associated with the media device.

The method 500 includes receiving an advertisement at a media device, at 502. In the particular embodiment illustrated in FIG. 5, information associated with the advertisement identifies a rating of the advertisement. For example, referring to FIG. 1, the advertisement 108 received at the media device 102 includes the rating 110. In some cases, the rating 110 may represent a rating for the advertisement 108 that is similar to television content ratings (e.g., Y, TVG, TVPG, TVMA, also V, S, AC) and/or movie ratings (e.g., G, PG, PG-13, R). In some cases, an advertisements may be assigned a rating based on industry agreement or standard (such as for television content ratings). As a first illustrative example, in the event that the advertisement 108 includes an alcohol advertisement, the rating 110 may correspond to an R rating. As a second illustrative example, in the event that the advertisement 108 includes a violent video game advertisement, the rating 110 may correspond to a V rating. As a third illustrative example, in the event that the advertisement 108 includes a toy advertisement, the rating 110 may correspond to a G rating.

The method 500 includes receiving information from one or more sensors, at 504. The information received from the one or more sensors indicates that a viewer (e.g., a child) is located within an area associated with the media device. For example, referring to FIG. 1, the one or more sensors 104 may provide the sensor data 114 to the media device 102 to indicate that the viewer 116 (e.g., a child) is located within the area associated with the media device 102. To illustrate, referring to FIG. 2, the sensor(s) 104 may determine that the viewer 116 is located within the area 118 associated with the media device 102 based on the wireless signal 204 received from the mobile computing device 206. As another example, referring to FIG. 3, the sensor(s) 104 may determine that the viewer 116 (e.g., a child) is located within the area 118 associated with the media device 102 in response to wireless detection of the token 308. As a further example, referring to FIG. 4, the sensor(s) 104 may provide information (e.g., size, shape, voice, face information) to the media device 102, and the media device 102 may estimate an age or an age range of the viewer 116 based on the information.

The method 500 includes determining whether the advertisement includes age-inappropriate content for the viewer based on the rating and based on the information, at 506. For example, referring to FIG. 1, the media device 102 may determine whether the advertisement 108 includes age-inappropriate content for the viewer 116 based on the rating 108 included with the advertisement 108 received from the network 112 and based on the age or the age range of the viewer 116. As a first illustrative example, the advertisement 108 may include an alcohol advertisement, and the rating 110 may correspond to an R rating. In this case, the media device 102 may determine that the advertisement 108 includes age-inappropriate content for the viewer 116 (e.g., a child) based on the R rating. As a second illustrative example, the advertisement 108 may include a violent video game advertisement, and the rating 110 may correspond to a V rating. In this case, the media device 102 may determine that the advertisement 108 includes age-inappropriate content for the viewer 116 based on the V rating and based on whether the age or age range of the viewer 116 does not satisfy an age threshold associated with the V rating.

In response to determining that the advertisement includes age-inappropriate content for the viewer, the method 500 includes inhibiting display of the advertisement, at 508. For example, referring to FIG. 1, the media device 102 may inhibit display of the advertisement 108 at the display device 106. FIG. 1 illustrates a particular example in which the message 120 indicates that the advertisement 108 has been blocked. Alternatively, as described further with respect to FIGS. 2-4, other examples of inhibiting display may include displaying alternative age-appropriate content (see FIG. 2), changing to an alternative channel with age-appropriate content (see FIG. 3), or displaying a message prompting a user to confirm that a child is present (see FIG. 4), among other alternatives (e.g., blanking a screen during the advertisement 108).

When the advertisement does not include age-inappropriate content for the viewer, the method 500 may include displaying the advertisement, at 510. As an illustrative example, referring to FIG. 1, the advertisement 108 may include a toy advertisement, and the rating 110 may correspond to a G rating. In this case, the media device 102 may display the advertisement 108 at the display device 106 in response to determining that the advertisement 108 does not include age-inappropriate content for the viewer 116 based on the G rating. Alternatively, when the viewer 116 is an adult, the media device 102 may replace the advertisement 108 having the G rating with another advertisement, such as an advertisement with a mature rating.

Thus, FIG. 5 illustrates that in some cases, an advertisement may include information that identifies a rating of the advertisement. For example, the rating may represent a rating that is similar to television content ratings (e.g., Y, TVG, TVPG, TVMA, also V, S, AC) and/or movie ratings (e.g., G, PG, PG-13, R). The rating may be assigned to the advertisement (e.g., by an advertiser or a service provider) based on industry agreement or standard (such as for television and/or movie content ratings). A media device may inhibit display of a particular advertisement when the rating indicates that the advertisement includes age-inappropriate content for a particular viewer (e.g., a child) and sensor(s) indicate that the particular viewer is located within an area associated with the media device.

Figure 6:
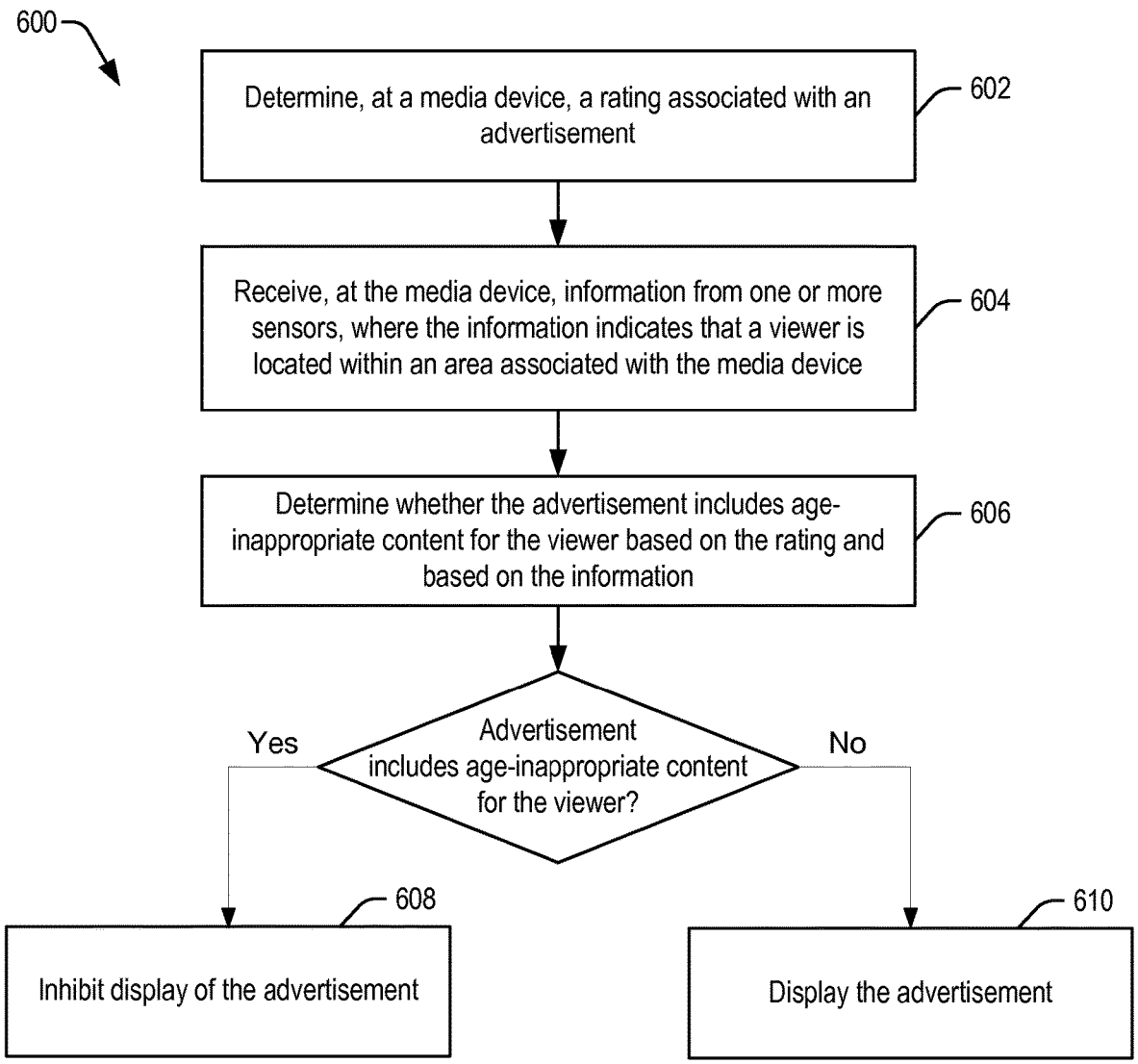
FIG. 6 is a flowchart that illustrates another embodiment of a method to inhibit display of advertisements that include age-inappropriate content for a viewer (e.g., a child)

Referring to FIG. 6, another particular embodiment of a method to inhibit display of advertisements that include age-inappropriate content is illustrated and generally designated 600. FIG. 6 illustrates an example in which a media device may determine a rating associated with an advertisement and may inhibit display of the advertisement when the advertisement includes age-inappropriate content for a particular viewer (e.g., a child) and the particular viewer is located within an area associated with the media device.

The method 600 includes determining, at a media device, a rating associated with an advertisement, at 602. For example, referring to FIG. 2, the media device 102 may determine a rating associated with the advertisement 202. The advertisement 202 of FIG. 2 does not include information that identifies a rating of the advertisement 202. Accordingly, the advertisement module 210 of the media device 102 may access the user profile 212 that includes user defined settings 214 to determine the rating of the advertisement 202. In some cases, a user (e.g., an adult) may configure the media device 102 to assign particular ratings to specific genres of advertisements and may save the user defined settings 214 in the memory 206. As illustrative, non-limiting examples, the user may configure the media device 102 to assign a mature rating (e.g., an R rating) to advertisements related to alcohol, a violent rating (e.g., a V rating) to violent video game advertisements, and a general audience rating (e.g., a G rating) to toy advertisements, among other alternatives.

In other cases, a user (e.g., an adult) may activate an age-inappropriate advertisement inhibition feature at the media device 102, and the media device 102 may automatically determine a rating associated with a particular advertisement. For example, referring to FIG. 3, the genre determination module 316 of the media device 102 may determine the genre associated with the advertisement 302 based on the closed captioning information 304, the metadata 306, or a combination thereof. As an illustrative, non-limiting example, the closed captioning information 304 associated with the advertisement 302 may include one or more words that are stored in the memory 206 and that are associated with a genre of alcohol advertisements. As another example, the metadata 306 associated with the advertisement 302 may include one or more words associated with particular advertisers. To illustrate, with respect to the genre of alcohol advertisements, the memory 206 may store information such as names of alcoholic beverage companies, names of particular brands of alcoholic beverages, types of alcoholic beverages (e.g., beer, wine, rum, whiskey, etc.), among other alternatives. The advertisement module 314 of the media device 102 may determine the rating associated with the advertisement 302 based on the genre of the advertisement 302. As an illustrative, non-limiting example, in the event that the genre determination module 316 determines that the advertisement 302 is in the genre of alcohol advertisements, the advertisement module 314 may assign a rating corresponding to an R rating, representing age-inappropriate content for particular viewers (e.g., children).

The method 600 includes receiving, at the media device, information from one or more sensors, at 604. The information indicates that a viewer is located within an area associated with the media device. For example, referring to FIG. 2, the sensor(s) 104 may determine that the viewer 116 is located within the area 118 associated with the media device 102 based on the wireless signal 204 (e.g., an NFC signal) received from the mobile computing device 206. As another example, referring to FIG. 3, the sensor(s) 104 may determine that the viewer 116 is located within the area 118 associated with the media device 102 in response to wireless detection of the token 308. As a further example, referring to FIG. 4, the sensor(s) 104 may provide information (e.g., size, shape, voice, face information) to the media device 102, and the media device 102 may estimate an age of the viewer 116 based on the information.

The method 600 includes determining whether the advertisement includes age-inappropriate content for the viewer based on the rating and based on the information, at 606. For example, referring to FIG. 2, the media device 102 may determine whether the advertisement 202 includes age-inappropriate content for the viewer 116 based on a rating that is determined by the advertisement module 210 and based on an age or an age range of the viewer 116. As a first illustrative example, the advertisement 202 may include an alcohol advertisement, and the rating may correspond to an R rating. In this case, the media device 102 may determine that the advertisement 108 includes age-inappropriate content for the viewer 116 based on the R rating. As a second illustrative example, the advertisement 108 may include a violent video game advertisement, and the rating 110 may correspond to a V rating. In this case, the media device 102 may determine that the advertisement 108 includes age-inappropriate content for the viewer 116 based on the V rating.

In response to determining that the advertisement includes age-inappropriate content for the viewer, the method 600 includes inhibiting display of the advertisement, at 608. When the advertisement does not include age-inappropriate content for the viewer, the method 600 may include displaying the advertisement, at 610.

Figure 7:
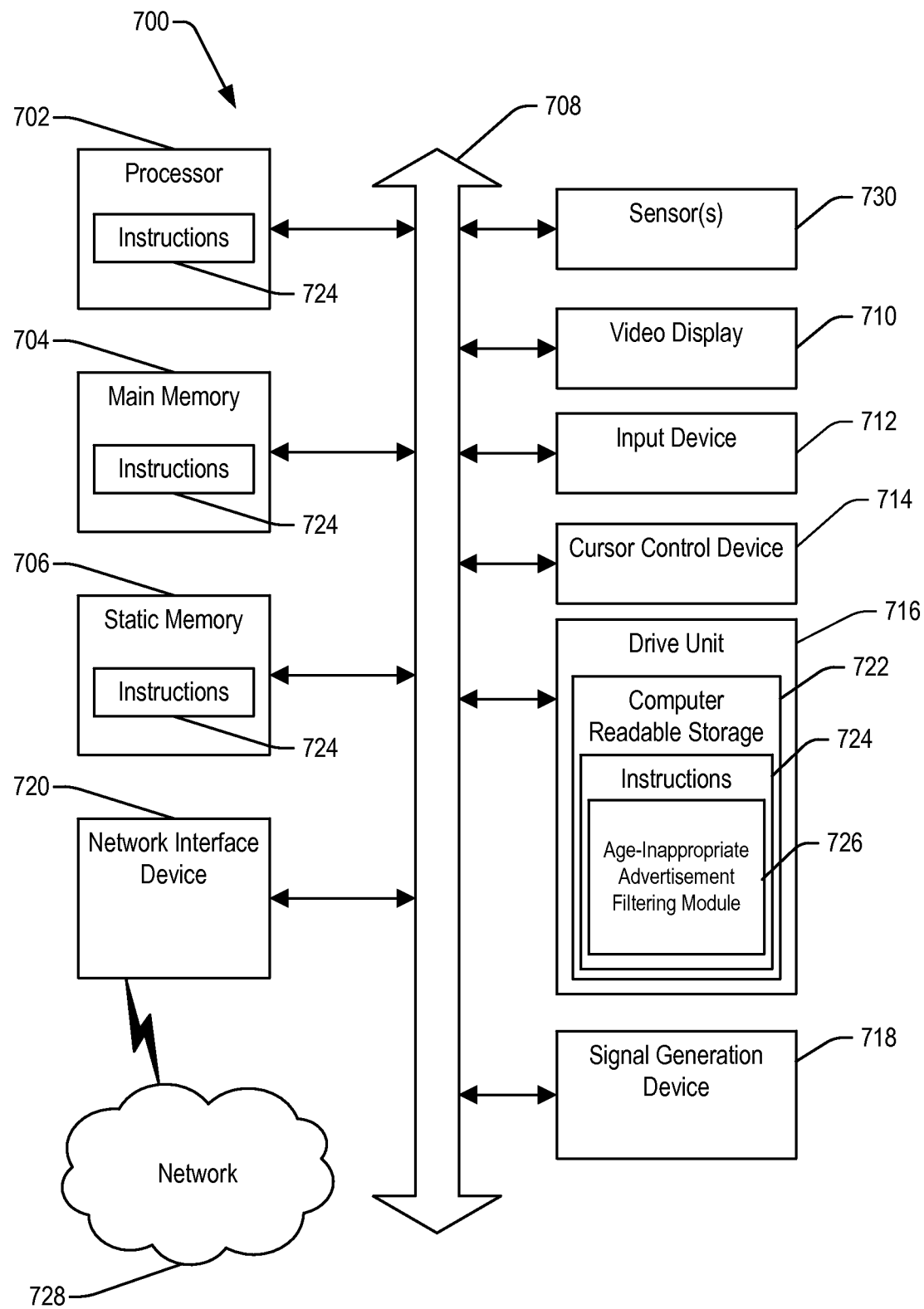
FIG. 7 is a block diagram of an illustrative embodiment of a general computer system.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or may be included within any one or more of the media device 102, the computing device 206, the device 312, or combinations thereof described with reference to FIGS. 1-4.

In a networked deployment, the computer system 700 may operate in the capacity of a client user computer in a server-client user network environment, or as a peer computer system in a peer-to-peer (or distributed) network environment. The computer system 700 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box (STB), a television, an automobile, a customer premises equipment device, an endpoint device, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. For example, the processor 702 may include or correspond to a processor of the media device 102, the computing device 206, or the device 312. Moreover, the computer system 700 may include a main memory 704 and a static memory 706, which can communicate with each other via a bus 708. For example, the main memory 704 may include or correspond to the memory 206 of the media device 102, a memory of the computing device 206, or a memory of the device 312. As shown, the computer system 700 may further include a video display unit 710, such as a liquid crystal display (LCD), a light emitting diode (LED) display, a touch screen display, a flat panel display, or a solid state display. For example, the video display unit 710 may correspond to the display device 106 associated with the media device 102. Additionally, the computer system 700 may include an input device 712, such as a remote control device (e.g., the remote control 426 associated with the media device 102) or a keyboard (e.g., for an adult user to provide a personal identification number or other identification information). In some cases, the computer system 700 may include a cursor control device 714, such as a mouse or a cursor control of a tablet computer (e.g., for an adult user to select a particular selectable option, such as the selectable options 422, 422 illustrated in FIG. 4). In some embodiments, the input device 712 and the cursor control device 714 may be integrated into a single device, such as a capacitive touch screen input device. The computer system 700 may also include a drive unit 716, a signal generation device 718, such as a speaker, and a network interface device 720.

In a particular embodiment, as depicted in FIG. 7, the drive unit 716 may include computer-readable storage 722 in which authentication information (e.g., a personal identification number of an adult user, such as the adult user 404 of FIG. 4), identifiers (e.g., of particular viewers, such as one or more children), and one or more sets of instructions 724, e.g. software, can be embedded. The computer-readable storage 722 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 724 may embody one or more of the methods or logic as described herein. In the embodiment illustrated in FIG. 7, the instructions 724 include an age-inappropriate advertisement filtering module 726. The instructions 724, including the age-inappropriate advertisement filtering module 726, may be executable by the processor 702 to perform one or more functions or methods described herein, such as the methods 500 or 600 described with reference to FIG. 5 or FIG. 6, respectively. In a particular embodiment, the instructions 724 may reside completely, or at least partially, within the main memory 704, the static memory 706, and/or within the processor 702 during execution by the computer system 700. The main memory 704 and the processor 702 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 722 that stores instructions 724, so that a device connected to a network 728 may communicate voice, video or data over the network 728. While the computer-readable storage 722 is shown to be a single storage unit, the computer-readable storage device 722 may include a single storage unit or multiple storage units, such as a centralized or distributed database, and/or associated caches and servers that store one or more sets of instructions. The computer-readable storage 722 is capable of storing a set of instructions for execution by a processor to cause a computer system to perform any one or more of the methods or operations disclosed herein.

In a particular non-limiting, exemplary embodiment, the computer-readable storage 722 may include a solid-state memory such as embedded memory (or a memory card or other package that houses one or more non-volatile read-only memories). Further, the computer-readable storage 722 may be a random access memory or other volatile re-writable memory. Additionally, the computer-readable storage 722 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 700 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:

receiving, by a media device, a first advertisement and a second advertisement that are selectable based on parental controls, wherein the second advertisement serves as a substitute for the first advertisement to achieve compliance with the parental controls;

determining, by the media device, a first rating associated with the first advertisement and a second rating associated with the second advertisement;

receiving, by the media device, sensor data from a sensor, wherein the sensor data indicates that a viewer is located within a viewing area associated with presentations by the media device;

estimating, by the media device, an age or an age range of the viewer;

determining, by the media device, that the viewer is subject to the parental controls in accordance with the estimating and in accordance with a confirmation from an adult viewer that the viewer is subject to the parental controls;

making an initial determination that the first advertisement is displayable to the viewer based on the first rating and in accordance with the determining that the viewer is subject to the parental controls; and in response to determining that information processed from the sensor data indicates no children in the viewing area and indicates that viewers in the viewing area are adults, replacing, by the media device, the first advertisement with the second advertisement prior to a presentation by the media device, wherein the second rating indicates that the second advertisement is appropriate for a mature audience.

2. The method of claim 1, wherein the first advertisement includes metadata that identifies the first rating.

3. The method of claim 1, further comprising determining that the viewer is located within the viewing area in response to detecting a token.

4. The method of claim 3, wherein the token is detectable based on a radio frequency identification signal or a near-field communication signal, and wherein the token is transmitted by a device of a child.

5. The method of claim 1, wherein the sensor data comprises voice data, facial recognition data, or both.

6. The method of claim 1, wherein the first rating is determined by the media device based on a genre of the first advertisement, the method further comprising:

sending the second advertisement from the media device to a display device.

7. The method of claim 1, wherein the media device determines the first rating of the first advertisement based on closed captioning information associated with the first advertisement.

8. The method of claim 1, further comprising, in response to determining that second information processed from the sensor data indicates a child in the viewing area, sending the first advertisement to a display device.

9. The method of claim 8, further comprising preventing display of the second advertisement during a time period when the second information processed from the sensor data indicates the child in the viewing area, wherein the preventing display of the second advertisement includes displaying a third advertisement with a third rating appropriate for children or displaying an alternative channel that includes age-appropriate content for the viewer.

10. The method of claim 1, wherein the sensor data comprises voice data, and wherein the information processed from the sensor data comprises information processed from the voice data.

11. The method of claim 1, wherein the sensor data comprises a wireless signal transmitted by a mobile computing device of a child, wherein the wireless signal includes a media access control (MAC) address of the mobile computing device, and wherein the making of the initial determination that the first advertisement is displayable to the viewer is further in accordance with the MAC address.

12. The method of claim 1, wherein the sensor data comprises temperature data, the method further comprising:
determining, by the media device, that the viewer has entered the viewing area based on detecting an increase in temperature in the viewing area in accordance with the temperature data.

13. The method of claim 1, wherein the sensor data comprises a first signal received by the media device from a remote control, wherein the first signal indicates that the viewer is a child, wherein the making of the initial determination that the first advertisement is displayable to the viewer is further based on the first signal, and wherein the information processed from the sensor data that indicates no children in the viewing area and indicates that viewers in the viewing area are adults is based on a second signal received by the media device from the remote control subsequent to receipt of the first signal by the media device.

14. The method of claim 1, wherein the sensor is included in a gaming device that is communicatively coupled to the media device.

15. The method of claim 1, wherein the estimating of the age or the age range of the viewer is based on the sensor data, and wherein the sensor data includes size, shape, voice, and face information.

16. A computer-readable storage device storing instructions executable by a processor of a media device to perform operations, the operations comprising:
receiving, by the media device, a first advertisement and a second advertisement that are selectable based on parental controls, wherein the second advertisement serves as a substitute for the first advertisement to achieve compliance with the parental controls;
determining, by the media device, a first rating associated with the first advertisement and a second rating associated with the second advertisement;
receiving, by the media device, sensor data from a sensor, wherein the sensor data indicates that a viewer is located within an area associated with presentations by the media device;
estimating, by the media device, an age or an age range of the viewer;
making an initial determination, by the media device and in accordance with the estimating and in accordance with a confirmation from an adult viewer that the viewer is subject to the parental controls, that the first advertisement is displayable to the viewer based on the first rating, wherein the first rating indicates that the first advertisement is appropriate for children; and
in response to determining that information processed from the sensor data indicates no children in the area and indicates that viewers in the area are adults, replacing, by the media device, the first advertisement with the second advertisement prior to a presentation of the first advertisement by the media device, wherein the second rating indicates that the second advertisement is appropriate for a mature audience.

17. The computer-readable storage device of claim 16, wherein the operations further comprise, in response to determining that second information processed from the sensor data indicates a child in the area, sending the first advertisement to a display device.

18. A media device comprising:
a sensor;
a processor; and
a memory in communication with the processor, the memory including instructions executable by the processor to perform operations, the operations including:
receiving a first advertisement and a second advertisement that are selectable based on parental controls, wherein first information associated with the first advertisement identifies a rating of the first advertisement;
receiving sensor data from the sensor, wherein the sensor data indicates that a viewer is located within a viewing area associated with presentations by the media device;
estimating, by the media device, an age or an age range of the viewer;
making an initial determination that the first advertisement is displayable to the viewer based on the rating and in response to determining that the viewer is subject to the parental controls in accordance with the estimating and in accordance with a confirmation from an adult viewer that the viewer is subject to the parental controls; and
in response to determining that second information processed from the sensor data indicates no children located in the viewing area and indicates that viewers in the viewing area are adults, replacing the first advertisement with a second advertisement prior to a presentation of the first advertisement by the media device, wherein third information for the second advertisement indicates the second advertisement is appropriate for a mature audience.

19. The media device of claim 18, wherein the operations further comprise causing display of the second advertisement.

20. The media device of claim 18, wherein the operations further comprise displaying the first advertisement in response to the second information indicating presence of a child in the viewing area.

* * * * *